Feb. 16, 1960 V. H. PEOPLES 2,925,201
TRACTOR DRAWN SPREADER
Filed May 2, 1956 6 Sheets-Sheet 6

INVENTOR
VIRGIL H. PEOPLES
BY Strauch, Nolan & Neale
ATTORNEYS

United States Patent Office 2,925,201
Patented Feb. 16, 1960

2,925,201

TRACTOR DRAWN SPREADER

Virgil H. Peoples, Marysville, Ohio, assignor to The O. M. Scott & Sons Company, Marysville, Ohio, a corporation of Ohio Application May 2, 1956, Serial No. 582,235

24 Claims. (Cl. 222—177)

This invention relates to spreaders for distributing materials such as seeds, fertilizers and other chemicals over the soil. It utilizes basic features of my hopper type lawn spreader disclosed and claimed in my U.S. Patent Re. 24,189 (formerly Patent No. 2,718,986), modified and improved in various important aspects to permit such spreaders to be drawn by a tractor or powered vehicle for large scale farming operations. In its preferred embodiment my invention includes novel spreader drawing devices and arrangements for single and gang spreaders that have material distribution control apparatus easily operable by the vehicle operator, the control apparatus utilizing an overcenter lock movement to maintain the distribution control in a shut-off position.

In prior art lawn spreader mechanisms, as exemplified by United States Reissue Patent No. 24,189, the spreader is constructed to be pushed by an operator and all of the material distribution control mechanism is on the rear of the spreader. For various reasons, push type spreaders do not give the most advantageous results if operation is reversed and the handles are used as drawing means for power operation as the spreader will then roll backwards over the ground, and will not distribute the material as satisfactorily because of the reversed cooperation between the rotating agitator and the variable discharge outlets.

Despite the active development of improved farm machinery by large manufacturing organizations with vast resources, a strong unfilled demand for improved machinery for spreading chemicals, fertilizer and seed exists, as evidenced by a recent recommendation by the Farm and Home Advisory Committee that the United States Department of Agriculture institute research to improve such machinery, which was broadcast by the National Broadcasting Company on March 14, 1956, based on a United Press radio release, on a farm news program, and the present invention fulfills this need for the first time.

Accordingly, one important aspect of my invention comprises a new type spreader drawing and control mechanism with an operating lever easily reached from the seat of a midget or garden tractor that still permits a rate control mechanism on the rear side of the spreader to bias the distribution outlet control to a positive, set position when operated to either the open or closed position, thereby adapting such spreaders for efficient large garden and lawn and small farming operations.

A further important aspect of the invention includes a structure for fastening a plurality of spreaders to distribute material evenly and accurately over a wide swath and so each spreader will take the roll of the ground without any of the spreader drive wheels leaving the soil, due to a depression or rise, that would cause a wide spreader to discontinue application of material. This novel drawing structure for a plurality of hopper type spreaders maintains the hoppers in properly aligned, longitudinal relation to each other, enabling complete coverage of the soil without excessive material overlap or without leaving void strips in between the material distribution path of each hopper.

My single and multiple hopper spreaders both use the improved and modified distribution outlet control linkage with spreader drawing structure, however the rate adjustment mechanism is substantially identical to that disclosed in U.S. Reissue Patent No. 24,189. In the gang type spreader a novel operating linkage is used enabling simultaneous dstribution control of all spreaders from one control lever closely adjacent the drive vehicle operator.

Accordingly, a primary object of this invention resides in the provision of novel variable outlet spreader assemblies adapted to be attached to and controlled from a tractor or powered vehicle.

Another object of this invention resides in providing a novel gang spreader assembly emboding a multiplicity of relatively small hopper type spreaders in staggered relationship to one another with a novel single operating control for simultaneously controlling the material distribution mechanism of all hoppers in the gang arrangement.

Still another object resides in providing a novel draw member, for use with a material distribution spreader, incorporating structure enabling use with small or large powered vehicles.

A further object resides in providing an auxiliary fitting for attachment to adjacent ends of staggered hopper spreaders in a gang spreader to aid in maintaining longitudinal alignment of the hoppers and at the same time permitting relative vertical displacement of adjacent staggered hoppers.

Further novel features and objects of this invention will become apparent from the following detailed description and tne appended claims taken in conjunction with the accompanying drawings which snow preferred embodiments thereof, in which:

Figures 2, 3:
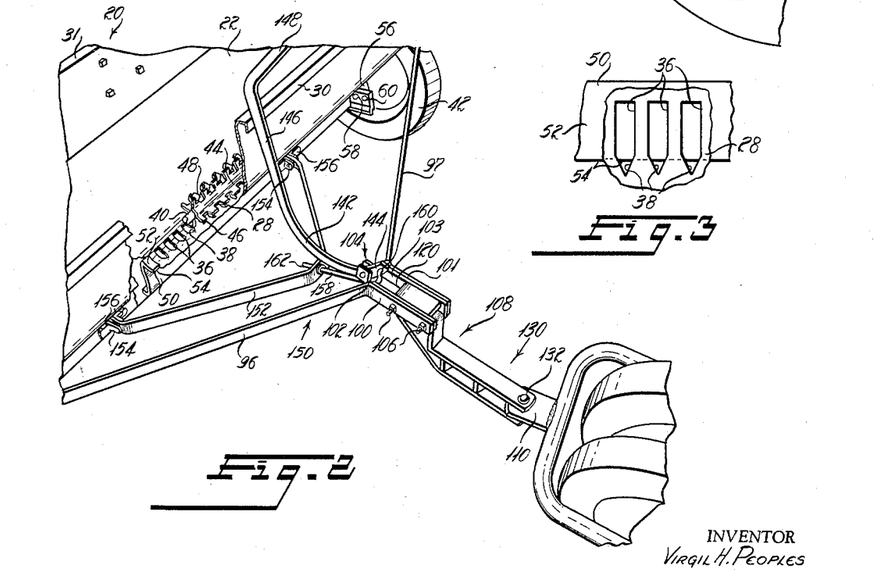
Figure 2 is a partial perspective view of the spreader seen in Figure 1, with the distribution control in a shut-off position, portions of the hopper, agitator and outlet control being broken away to snow details of construction.
Figure 3 is a detail view showing a portion of the outlet apertures in the bottom of a hopper, and the outlet control vane in a controlled open position.

Both the single hopper spreader and the gang hopper spreader of this invention are intended to be pulled over the ground and utilize a wheeled hopper, similar in many respects to that disclosed in the aforementioned U.S. Reissue Patent No. 24,189. When the push type spreader of that patent is pushed forward the multiple vane type agitator will be rotated by its interconnection with at least one of the ground engaging wheels. The agitator will rotate so its vanes push the material being distributed down from the front part of the hopper into the divergent portions of the outlet and against a straight lateral leading edge of an outlet shutter or variable outlet control vane as it will hereinafter be termed. The same agitating and discharge action by a multiple vaned agitator is utilized in the hoppers of this invention and it is preferable that the distribution outlet be formed of a lateral row of variable area longitudinal slots convergent at their forward end as illustrated in Figures 2 and 3. The variable area of opening of the discharge outlet apertures will be determined by the adjustable rate control which is fully described and claimed in the aforementioned U.S. patent and will be briefly described hereinafter.

With respect to Figures 1 through 5 a single spreader 20 includes a hopper 22 with side panels 24 and 25 and a single, formed metal sheet 26 providing the front, rear and bottom hopper portions. The front and rear portions are convergent to a curved laterally extended bottom 28. The upper edges of the front and rear portions of sheet 26 are bent over at 30 and 31 to provide strength, a finished appearance and to furnish an integral guide structure for the rate adjustment mechanism 34 located on the rear side of the hopper.

The outlet from the hopper is through the curved bottom 28 which is pierced by a lateral row of longitudinally elongate apertures 36, each having convergent forward ends 38. Aperture forward ends 38 may have the V-shaped formation as shown or they may be convergently curved in any suitable manner, the primary purpose being to provide a graduated outlet for minute, variable, controlled distribution of finely granulated material or seeds.

Figure 4:
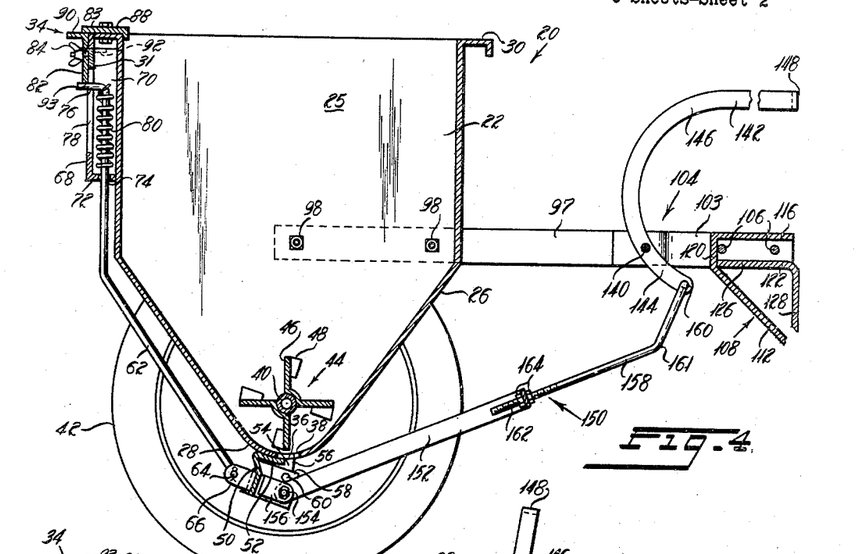
Figure 4 is a side cross section view of a single hopper and drawing structure with the distribution outlet control in open position.

A shaft 40 is journalled in hopper side panels 24 and 25 and passes laterally immediately above the curved bottom 28 of the hopper. Wheels 42 are mounted on the ends of shaft 40 which project beyond the hopper side panels 24 and 25 and at least one of the wheels 42 is non-rotatably fastened to shaft 40 to cause powered rotation of shaft 40 during passage of the hopper over the ground. Inside the hopper 22, an agitator 44, of the type described in U.S. Patent No. 2,753,086, is fixed on and rotates with shaft 40. It will be seen in Figure 2 that each individual agitator blade 46 has a forwardly projected portion 48 which is aligned with the edge of an associated aperture 36 and will act to confine material to the face of the blade 46 which in turn forces the material down into an aligned outlet aperture 36. A shutter-type control vane 50 is disposed to extend laterally across the hopper bottom 28 and includes a contoured upper portion 52, with a substantially straight leading edge 54, disposed closely adjacent the bottom surface of the hopper. Contoured upper portion 52 is of sufficient width, laterally and fore and aft, to cover all of the apertures 36 when the control vane 50 is in a closed position. Shutter control vane 50 is pivotally mounted on wheel shaft 40 by means of the brackets 56 which are apertured and fit over the projected ends of shaft 40 at each side of the hopper. The shutter control vane 50 is adjustably fastened to slotted apertures in the lower end of each bracket 56 by end flanges 58 and bolts 60. The contoured curvature of the upper portion 52 of control vane 50 enables the vane to have a snug fit against the lower surface of the hopper bottom 28 and brackets 56 enable pivotal movement of the control vane relative to the hopper so the row of apertures 36 may be variably uncovered for desired rates of discharge. As control vane 50 is pivoted to open the outlet apertures 36, the leading edge 54 is shifted from the front toward the rear of the row of apertures 36. Figure 3 illustrates control vane 50 in a slightly open position wherein the leading edge 54 permits a small opening at the convergent forward portions of apertures 36. Figure 4 illustrates another open position of control vane 50 with the apertures 36 open to a larger extent. With such an aperture and associated outlet control vane construction, the vanes 46 of agitator 44 will force material down from the front of the hopper past the convergent ends 38 of apertures 36 and against the control vane straight edge 54 which will deflect the granular materials down and out of the hopper, through the open portion of apertures 36 ahead of control vane edge 54.

Preliminary adjustment of the control vane 50 is enabled by the attachment through adjustment bolts 60 on the brackets 58. However, operational adjustment of control vane 50 is determined by the rate control mechanism 34 mounted on the rear end of hopper 22. This mechanism is clearly shown in Figure 7, but is illustrated in cross section in Figures 4 and 5 and will be described relative thereto. The rate control mechanism consists of a rod 62 having a bent lower end 64 which is pivotally engaged in a hole formed in control vane lug 66. Rod 62 has a slight intermediate bend and extends vertically up the exterior of the rear end of hopper 22 to be guided for its vertical movement by means of a plate 68 bolted on the rear sheet portion of hopper 22. Plate 68 is essentially a box-like structure having side flange members 70, providing a means for bolting the plate to the hopper, and a bent bottom flange 72 apertured at 74 to enable passage of rod 62 with a loose fit between the plate 68 and the back wall of the hopper 22. The upper end 76 of rod 62 is bent rearward at right angles to the main body of rod 62 to form a guide and abutment lug projecting through a vertical slot 78 in plate 68 and with aperture 74 guides the vertical movement of rod 62. A compression spring 80 is provided on rod 62 between the bent lug 76 and the bent bottom portion 72 of plate 68 to urge rod 62 in an upward direction, which movement, by virtue of the pivoted connection of rod 64 with the control vane lug 66, tends to pivot the control vane 50 to an open position.

A cam plate 82 is slidably fastened adjacent the turned rear edge 31 of hopper 22 by means of a threaded stud 83 welded adjacent the top edge of plate structure 68, and wing nut 84. Stud 83 extends rearwardly from plate structure 68 and through a lateral slot 86 (Figure 7) in the cam plate 82 to enable lateral shifting of the cam plate 82 relative to the rod lug 68. The upper edge of cam plate 82 cooperates with an indicator 88 bolted to the top rear edge 31 of hopper 22. Scale indications (not shown) for various discharge rates may be provided on the flanged portion 90 of cam plate 82. To maintain proper horizontal and vertical orientation and guided lateral adjustment of cam plate 82 parallel with the top and bottom of hopper 22, two horizontal lugs 92, one at each end of cam plate 82, fit under the bent rear hopper edge 31. Depending upon the laterally adjusted position of cam plate 82, the rod 62 will be permitted to move under bias of spring 80 to a predetermined position where its bent upper lug 76 engages the cam shaped lower edge 93 of plate 82, thus determining the pivotal position of control vane 50 which will uncover the desired area of outlet apertures 36, as shown in Figures 3 and 4. The wing nut 84, used to clamp the cam plate 82 in adjusted position can be replaced if desired by the molded knob nut construction 84' shown in Figure 7.

The mechanism enabling operational control of the material distribution outlet will be fully described hereinafter and will follow a description of the drawing structure for attachment to a power vehicle. It is sufficient to say at this stage, that a mechanism is attached to the front portion of control vane 50 to exert a force pivoting the control vane forward to a position covering all of the outlet apertures 36 which force will compress the spring 80 to a position as shown in Figure 5.

Single spreader drawing structure

Figure 1:
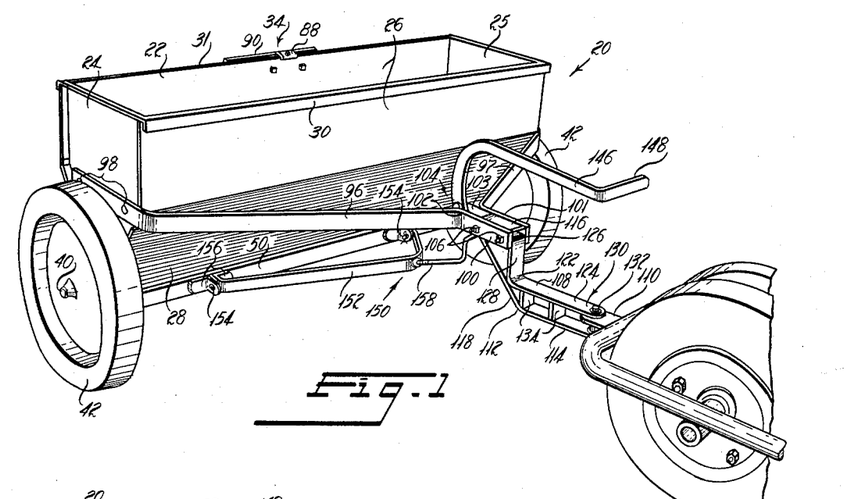
Figure 1 illustrates one embodiment of the invention as incorporated in a single tractor drawn spreader, showing such a spreader in perspective view with the material distribution control in open position.
Figure 5:
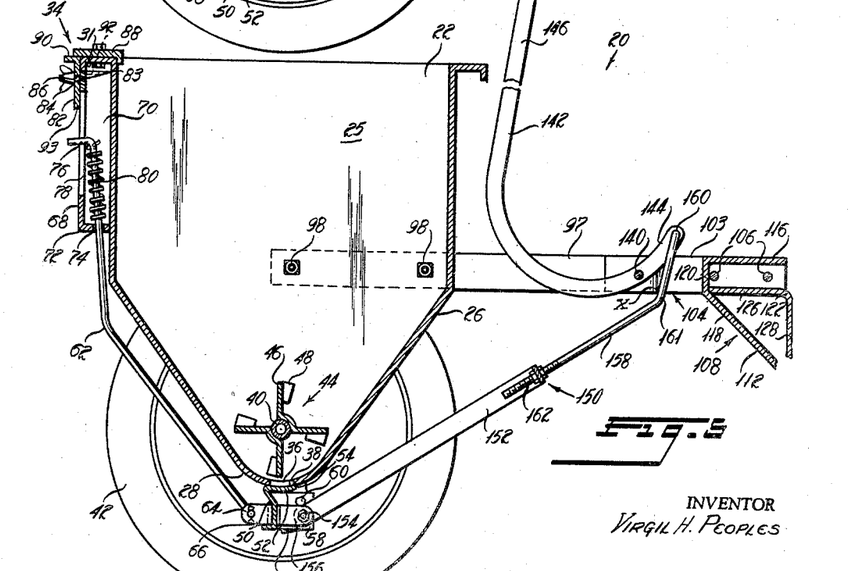
Figure 5 is a side cross section view similar to Figure 4, illustrating the material distribution outlet control in a closed position.
Figure 11:
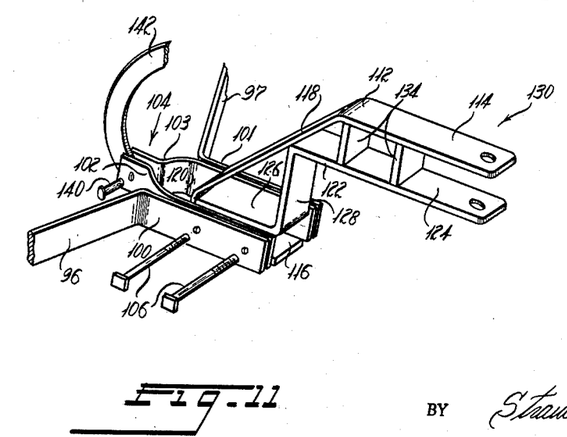
Figure 11 is an enlarged perspective illustrating details of the construction of the single spreader draw member installed for use with large tractors.

Clearly illustrated in Figures 1 and 2, with various details shown in Figures 4, 5 and 11, the single spreader drawing structure consists of two draw braces 96 and 97 fastened to the side panels 24 and 25 of hopper 22 by nuts and bolts 98. Braces 96 and 97 are disposed horizontally and extend in a forward direction, convergent to parallel end portions 100 and 101 which are spaced a slight distance apart. Placed between the brace end portions 100 and 101 are two parts 102 and 103 of an operating lever bracket 104. Two bolts 106 pass through the draw brace end portions 100 and 101 and the forward portions of the two bracket parts 102 and 103, maintaining the four parts in substantially unitary relationship. This structure constitutes a draw bar arrangement for the single spreader. A separable drawing member 108 fits between the forward draw brace ends 100 and 101 and between the parts 102 and 103, passing around the bolts 106. The draw member 108 is secured in position by tightening the nuts on the ends of bolts 106. Drawing member 108 is constructed with an off-set forwardly projected portion adapted to be hitched to a draw lug 110 of a small tractor type power vehicle. By loosening bolts 106 in the spreader draw bar structure and reversing the position of draw member 108 to a position as shown in Figure 11, the drawing member will be positioned at a higher level suitable for attachment to the draw lug of larger powered vehicles such as farm tractors.

With particular respect now to Figure 11, the drawing member structure 108 is shown to be fabricated of several pieces of bar stock bent and welded in the novel disclosed manner. An outer member 112 consists of two parallel end portions 114 and 116 with an angled intermediate portion 118 and a second intermediate portion 120 substantially normal to the parallel end portions 114 and 116, the end portions 114 and 116 being projected in the same direction. A second bar stock inner member 122 is bent in dog-leg fashion with two parallel end portions 124 and 126 connected by an intermediate normal portion 128. Inner member 122 is welded or otherwise suitably fastened to outer member 112 with the end portion 126 disposed between end portion 116 of outer member 112 and the angled intermediate portion 118, the end of portion 126 being welded at a position proximate the intersection of the angled part 118 and the normal intermediate part 120. The intersection of end portion 124 of the inner member, with the intermediate normal portion 128 abuts the angled intermediate portion 118 of the outer member and is welded or otherwise suitably fastened thereto. When integrally fastened in this manner, the end portion 114 of the outer member 112 and the end portion 124 of the second member 122 are disposed in parallel spaced relation to form a fork fitting 130 having its ends apertured to receive a draw pin 132 that passes through a hole in the tractor draw lug 110. To provide additional strength in drawing member fork fitting 130, braces 134 may be provided in welded relationship between the two end portions 114 and 124.

The opposite end of drawing member 108 is substantially hook shaped and passes below, behind and above the spreader draw bar bolts 106. It is readily seen that the drawing member 108 may be fastened to the spreader draw bar structure with forked fitting 130 offset below or above the draw bar structure for use with small or large tractors.

With particular reference now to Figures 4 and 5, a pivot pin 140, disposed between the rear ends of bracket parts 102 and 103, pivotally carries an operating lever 142 having a short lower lever arm 144 integral with and curving into an upper lever arm 146 which serves as a control lever for the distributor outlet operator. The end 148 of upper arm 146 may be bent laterally to provide a handle device if so desired. A linkage 150 between control lever 142 and control vane 50 consists of a V-shaped yoke 152, having its extremities connected by pivot pins 154 to lugs 156 fastened on the front side of control vane 50, and a rod 158 centrally adjustably fastened at one end to the V-yoke 152. The other end 160 of rod 158 has an upward bend 161 and is also bent at right angles to the rod and is pivotally retained in an aperture in the end of short lever arm 144. Rod 158 is threaded at end 162 where it is connected to the V-yoke 152, providing an adjustable length linkage between the operating lever 142 and control vane 50, the threaded end 162 being clamped to V-yoke 152 after adjustment by means of the two nuts 164.

In Figure 4, control vane 50 is in an open position as determined by adjustment of the cam plate 82, with the spring 80 biasing control vane 50 to partially open the apertures 36, in turn holding the linkage 150 toward the rear of the spreader mechanism and thereby determining the position of operating lever 142. In this open position the handle portion of lever 142 is extended forwardly in a substantially horizontal position and is conveniently located relative to the machine operator. Looking now at Figure 5, the control vane 50 is illustrated as closing the outlet apertures 36, holding the rate control rod 62 down against the biasing force of spring 80. The spring 80 is thus exerting a force tending to pivot the control vane 50 clockwise to an open position in turn exerting a pulling force on linkage 150. However it will be noted that operating lever 142 has been swung so arm 146 is in a substantially vertical position which in turn has moved the short lever arm 144 to a position where its pivotal connection with end 160 of rod 158 passes over center, past a line through control vane lug pivots 154 and the operating lever pivot 140. In this position the biasing force of spring 80 acting on the pivot lug 160 of short lever arm 144 creates a counter-clockwise force on operating lever 142 but, because the rod 158 engages the inner surface of the operating lever bracket 104 at the location marked X in Figure 5, the operating lever 142 is at its limit position on one side of dead-center position between pivots 140 and 154, in effect locking the control vane 50 in a position that maintains the outlet apertures 36 closed.

When the vehicle operator desires material distribution operation of the spreader he has only to reach back and pull the operating lever 142 forward until its short lever arm 144 moves the linkage pivot 160 clockwise past the dead center position from whence the resilient force of spring 80 will move control vane open to the predetermined distribtuion rate as set on the adjustable rate control mechanism. The adjustable connection between rod 158 and V-yoke 152 enables a preliminary adjustment to assure that control vane 50 closes apertures 36 when control lever 142 is in its vertical position.

Gang spreader

Figures 6, 7:
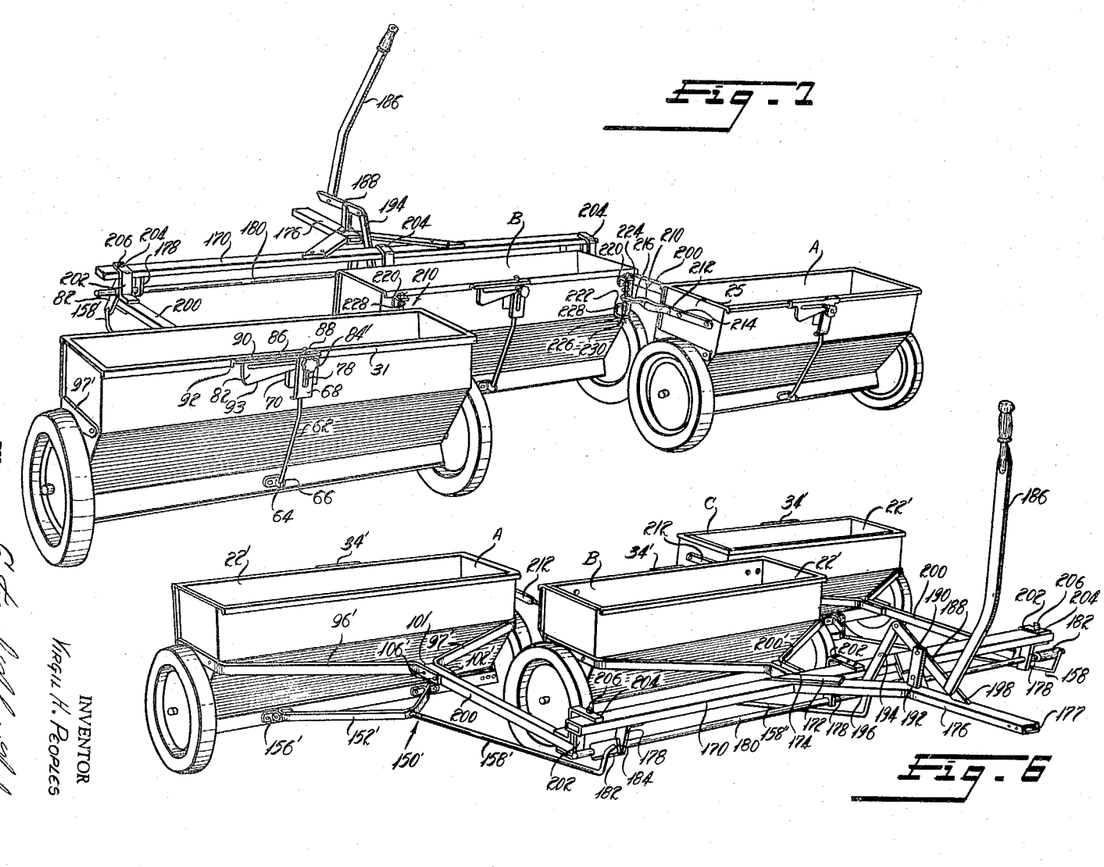
Figure 6 is a front perspective view, illustrating the invention embodied in a gang spreader having three hoppers arranged in a staggered V formation.
Figure 7 is a rear perspective view, illustrating the gang spreader of Figure 6.

Figures 6 and 7 illustrate a combination arrangement of a plurality of hopper type spreaders essentially identical, except for the drawing structure, as the single hopper spreader just described. The hoppers, wheels, agitator, control vane, and rate control are similar to those of the single hopper spreader and similar reference numbers will be used to designate such similar parts. The V-shaped linkage yoke 152′ can be identical to the linkage yoke 152 of the single spreader previously described, however the additional control rods and lever linkages are different in structure although utilizing the same over-center locking principle as does the operating linkage of the single spreader.

The gang drawing device of Figure 6 consists of a rectangular, tubular bar 170 connected by plates 172 and bolts 174 to a horizontally and forwardly disposed welded, Y-shaped drawing member 176, adapted at its forward end 177 to be connected to the draw lug of a powered vehicle, or the reversible drawing member 108 of Figure 11 can be fitted in the open end 177 and clamped by lateral bolts. Journalled below cross bar 170, on depending brackets 178, is a parallel rotatable shaft 180. Short toggle operating levers 182 having apertures 184 through their ends are secured at spaced intervals to the shaft 180.

Manual control of shaft 180 is provided by an integrally joined handle 186 and lever 188, the lever 188 being pivotally mounted by pin 190 on a vertical bracket 192 integrally fastened to the upper surface of drawing member 176 by welding. The rear arm of lever 188 is pivotally connected to a link 194 whose other end is pivotally connected to a short lever arm 196 secured to the shaft 180. Note that lever arm 196 and one of the toggle operating levers 182 can be combined as a unitary lever if desired. Movement of lever 188 about its pivot 190 will cause controlled rotation of shaft 180 and simultaneous rotation of all toggle operating levers 182. Looking at Figure 8 (hopper B), it will be noted that clockwise rotation of lever 188, by pulling forward on handle 186, is limited by the abutment of end 198 of lever 188 against the upper surface of drawing member 176. In this position all of the toggle operating levers 182 are in an upwardly disposed position, shown by phantom lines in Figure 8. Rearward movement of handle 186 will pivot lever 188 counterclockwise about pivot point 190 to move the link 194 downward, which in turn rotates shaft 180 clockwise moving all of the toggle operating levers 182 to a downwardy disposed position shown by solid lines in Figure 8.

Each of the hoppers 22' includes the side drawing braces 96' and 97', essentially identical with the single hopper drawing braces 96 and 97. The forward portions 101' and 102' of braces 96' and 97' are fastened to a forwardly projected draw bar 200 by bolts 106'. For convenience in reference the individual hoppers of the gang arrangement in Figures 6 and 7 will be designated as hoppers A, B and C. The draw bars 200 on hoppers A and C are the same length while the draw bar 200' of hopper B is of a shorter length, resulting in the staggered V arrangement illustrated. The forward end of each draw bar 200 and 200' includes an upwardly off-set forked fitting 202, integrally fixed to the draw bar as by welding. Each forked end 204 of fittings 202 is apertured to receive a vertical pin 206 passing through cross bar 170 to pivotally fasten each of hoppers A, B and C at spaced lateral intervals along the cross bar. Draw pins 206 are disposed on cross bar 170 at predetermined intervals so hoppers A and C have their wheels in overlapped relation behind the center hopper B and the adjacent ends of hoppers A and B and hoppers B and C will be substantially in longitudinal alignment to provide even deposit of distributed material on the ground covered by the three hoppers.

Figure 10:
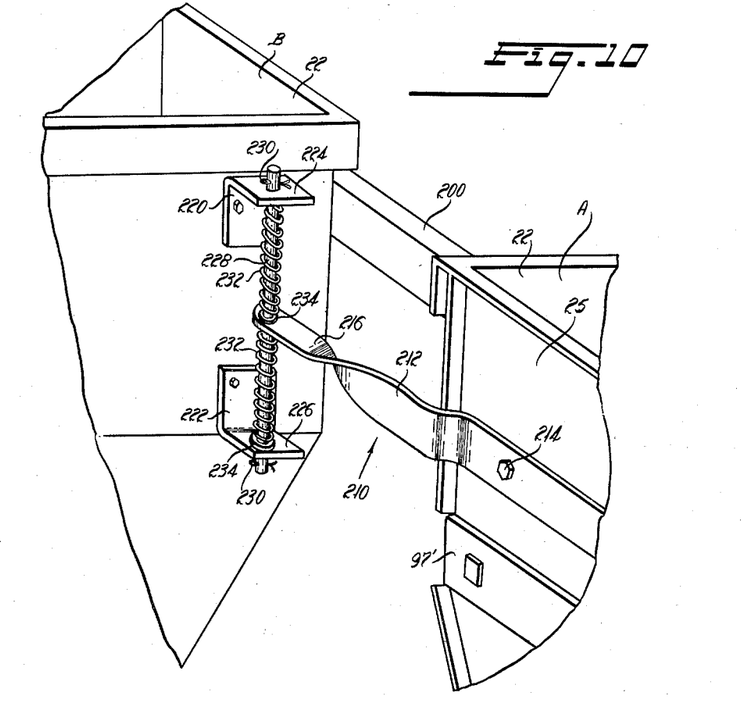
Figure 10 is an enlarged detail perspective view, illustrating the auxiliary fitting for maintaining longitudinal alignment between staggered hoppers.

To maintain the longitudinal alignment between the ends of adjacent hoppers, particularly when the gang spreader is pulled around a curve, an auxiliary alignment device 210, shown in Figure 7 and in detail in Figure 10, is provided between the adjacent ends of adjacent staggered hoppers. Fitting 210 consists of a preformed, bar stock brace 212 fastened to the side panel 25 of a hopper (A and C in Figures 6 and 7), by nuts and bolts 214. The forward end 216 of brace 212 projects beyond the front of the attached hopper and is bent to provide an off-set, horizontally disposed lug with an aperture provided adjacent the end. An upper and lower bracket 220 and 222 are fastened by suitable means, such as the bolts illustrated, to the rear face of a preceding hopper (adjacent both sides of hopper B in Figures 6 and 7). Each bracket 220 and 222 has a horizontal flange 224 and 226 respectively, apertured to receive a vertically disposed guide rod 228, maintained in vertical position by end cotter pins 230. The rod 228 passes through the aperture in the leading end 216 of bracket 212 which is disposed between the upper and lower bracket flanges 224 and 226. Lightweight springs 232, backed by washers 234, are disposed on the rod 228 above and below the horizontal leading edge 216 of bracket 212 and serve primarily to prevent binding between the forward bracket end 216 and rod 228 and to effectively eliminate any vibrational characteristics between the two relatively shiftable parts 212 and 228. With this arrangement the adjacent ends of staggered hoppers B and A and B and C are maintained in following alignment yet the hoppers 22 may move vertically relative to one another so the ground engaging wheels will always be in firm contact with the ground thereby permitting all of the hoppers to follow the contour of the land with hoppers A and C floating on the rods 228 affixed to each side of the rear of the leading hopper B. Inasmuch as many hopper spreaders are provided with a single agitator driving wheel, to enable proper maneuvering of the hopper, this auxiliary aligning arrangement will permit that drive wheel of every spreader to always be in contact with the soil, to assure proper flow of material by the force feed agitator.

Returning now to Figure 8, the control vane 50' has secured thereto the pivot lugs 156' that carry pivots 154' pivotally mounting the V-shaped yoke 152' in a manner identical with that described for the single spreader. The control linkage 150' is similar to that for the single spreader except the rod 158' will be longer in length, particularly for the outside spreaders A and C and, depending on the length of draw bar 200' for the center spreader B, the center spreader control linkage rod 158'' may be longer or shorter than that for the single spreader. The forward portion of each of rods 158' and 158'' is bent upward as is the single spreader rod 158 and has a transversely bent end 160' engaged and maintained by a cotter pin (not shown) in the apertured end of its associated toggle operating lever 182 which, as previously described, are rigidly secured to operating shaft 180.

Figure 8:
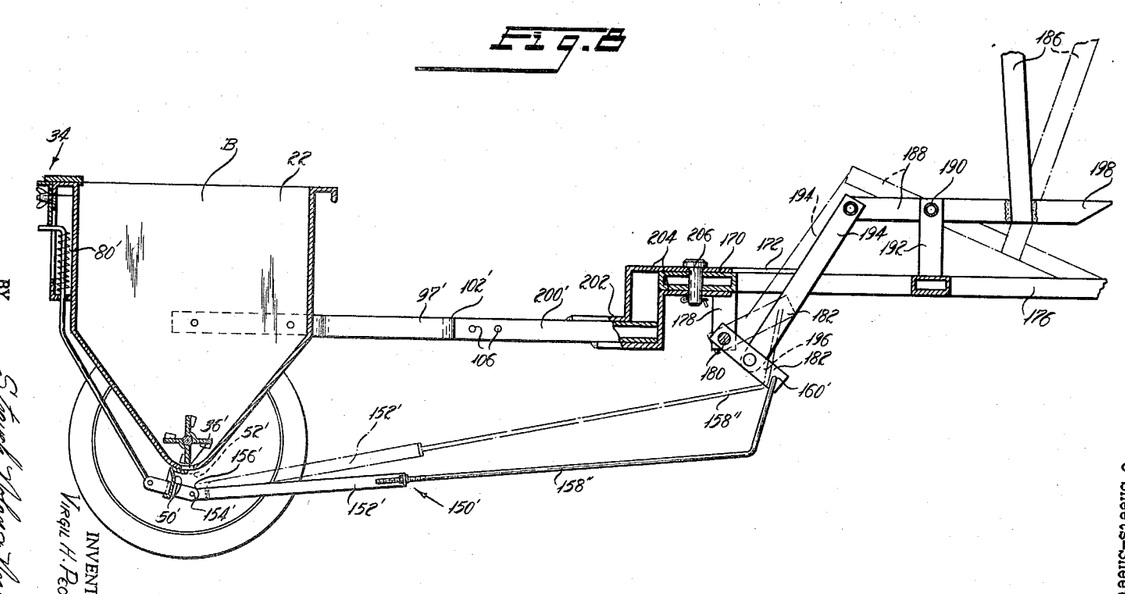
Figure 8 is a side cross section view of one of the hoppers and drawing structure as used in the gang spreader of Figure 6, with solid lines illustrating the material distribution control in the open position and phantom lines indicating the closed position.

Shown by the solid lines in Figure 8 control vane 50' is positioned to an open aperture discharge, the area of discharge opening being determined by the rate control mechanism 34. When the operating handle 186 is pulled to a forward position by the tractor operator (phantom lines) the lever 188 pivots about pin 190, pulling link 194 up and rotating shaft 180 in a counterclockwise direction. This movement of shaft 180 will simultaneously rotate all toggle operating levers 182 to the position shown by phantom lines, which raises all of the connecting linkages 150' and shifts them forwardly a distance sufficient to move the outlet control vanes 50' against the bias of springs 80' in all of the rate control mechanisms 34 and places the contoured upper shutter portion 52' over all apertures 36'. This movement will be essentially the same regardless of the length of rods 158' and 158''. Note the phantom lines of Figure 8 show that pivot point 160' between the rod 158'' and toggle operating lever 182 has passed over a dead center position between the axis of shaft 180 and the pivot points where the control linkage 150' connects to the outlet control vanes 50'. This overcenter movement occurs on all hoppers A, B and C and, as previously described, is limited by the engagement of end 198 of lever 188 with the upper surface of draw bar member 176 thereby providing an effective lock for all of the outlet control vanes 50' in closed position.

Figure 9:
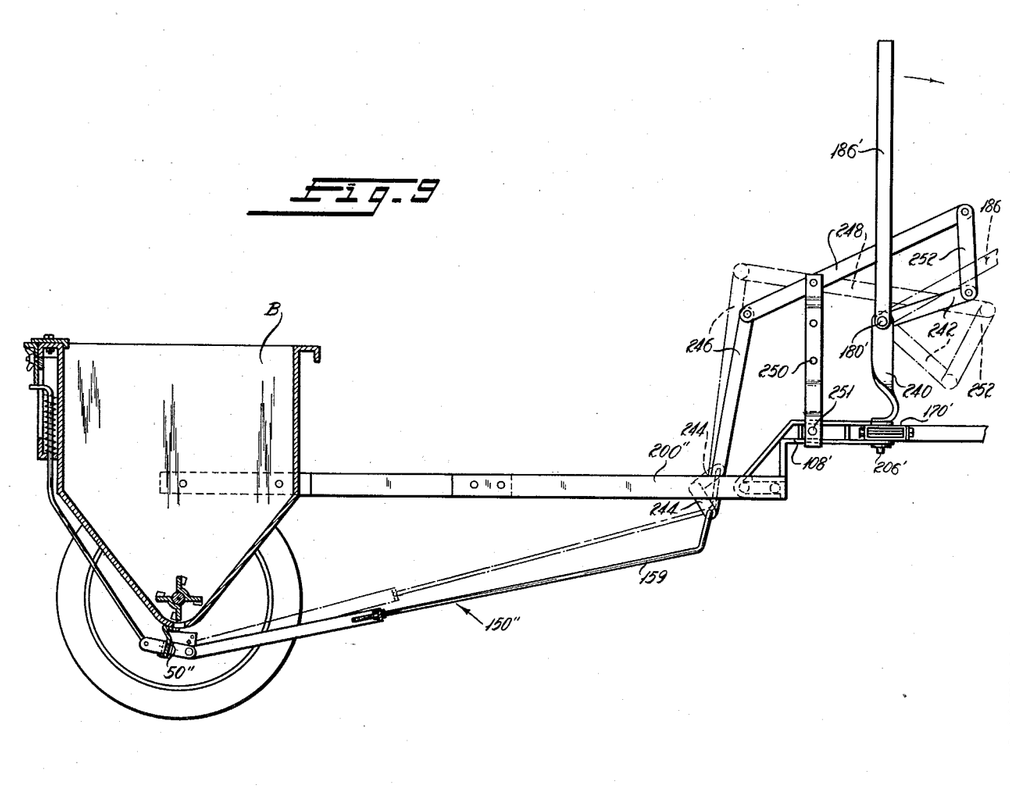
Figure 9 is a view similar to Figure 8, illustrating a modified linkage arrangement for obtaining simultaneous material distribution control in a gang hopper.

Figure 9 illustrates a modification of the control linkage for the gang spreader and shows the linkage as applied to hopper B. In this modification the common control shaft 180' is mounted on upstanding brackets 240 fastened to the cross bar 170'. Individual operating levers 242 are secured at predetermined transverse locations on shaft 180'. An operating lever 186' is centrally disposed and fixed to shaft 180' in a position convenient to the tractor operator. Each individual hopper control linkage 150" is pivotally connected to an independent toggle lever 244 pivotally mounted on the hopper draw bar 200". The pivotal connection of each rod 159 to its toggle lever 244 also serves as a pivotal connection with a vertical link 246 whose upper end is pivotally connected to a rocking lever 248 which is pivoted on a fixed bracket 250 fastened to draw member structure 108' of the individual hopper draw bar structure 200". The forward end of each rocking lever 248 is pivotally connected through a link 252 to an associated operating lever 242.

Thus movement of the control arm 186' in the forward direction will rotate shaft 180' clockwise and, through levers 242, links 252, levers 248, and links 246 will simultaneously move the toggle links 244 to an overcenter position, as shown in phantom lines, effectively locking the outlet control vane 50" in the closed aperture position. Limiting movement in this locked position is provided by contact of levers 248 with the shaft 180'. This modified gang control operating mechanism has a more complex linkage hence is more expensive than the control mechanism shown in Figure 8 which will be the preferred gang spreader embodiment. Note that the draw member 108' of each spreader is similar to drawing member 108 of the single spreader 20.

A portion of the gang hopper drawing structure shown in Figure 9 can be used when only a single hopper spreader is drawn by a large tractor. With reference to Figure 9, this is accomplished by disconnecting the pivotal connection between lever 248 and link 252 and removing the draw pin or bolt 206' between drawing member 108' and cross bar 170'. This will enable a single spreader to be removed from the gang spreader drawing structure and it will include its own overcenter toggle lever 244. Bracket 250 will remain clamped by a bolt 251 on the drawing member 108' with the pivotally mounted operating lever 248 and link 246 connected between lever 248 and toggle link 244. A rod (not shown) is fastened in the forward end of lever 248 and extends upward to a position adjacent the tractor seat for easy hand operation of the spreader outlet control. This same arrangement can be used with drawing member 108' in the upper position between the draw braces 96 and 97 of the single hitch spreader illustrated in Figures 1–5 with toggle link 244 pivoted on the pivot pin 140 disposed between the rear ends of bracket parts 102 and 103.

From the foregoing description it is understood that this invention encompasses draw structure for hopper type material spreaders as distinguished from pushing structure, embodiments being herein disclosed for use with a single hopper spreader and a multiple hopper gang spreader. All embodiments of the spreaders have material distribution means with a variable distribution outlet control cooperatively associated with the drawing structure and providing an overcenter locking movement for maintaining the outlet control or controls in a shutoff position. In the gang spreader embodiment all outlet controls are simultaneously operated by a common operator. Incorporated in the various embodiments are inventive components such as: the auxiliary fittings used with the staggered hoppers in the gang spreader for maintaining hopper alignment yet permitting relative vertical displacement of adjacent hoppers, and the reversible drawing member for the individual spreader that provides a convenient mechanism for adapting the spreader to large or small tractors with high and low draw lugs.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spreader for distributing material comprising: a plurality of individual hoppers, each having material distribution means with an adjustable outlet control resiliently biased toward a discharging position; a spreader drawing device comprising a drawing member adapted to be hitched to a power means, a draw bar structure fastened to each of said hoppers and extending forwardly thereof, and means at the forward end of each of said draw bar structures providing a connection to said drawing member; operating means, connected to said outlet controls, fixed on said drawing device with a pivotable lever mechanism including an overcenter locking movement to maintain said outlet controls in a non-discharging position against the resilient biasing force.

2. A spreader for distributing material comprising: a plurality of individual wheeled hoppers, each having laterally disposed material distributing means with an adjustable outlet control resiliently biased toward a discharging position; a spreader drawing device comprising a drawing member adapted to be hitched to a power means, a draw bar structure fastened to each of said hoppers and extending forwardly thereof and connected at their forward ends to said drawing member to dispose said hoppers in staggered relation wherein any hopper, staggered behind a preceding hopper, will have one end of its distributing means substantially longitudinally in line with the opposite end of the distributing means of the immediately preceding hopper; means connecting the aligned opposite ends of said hoppers to maintain the said longitudinal alignment and including means permitting vertical movement of one hopper relative to the aligned hopper; and operating means, connected to said outlet controls, mounted on said drawing device with a pivotable lever mechanism including an overcenter locking movement to maintain said outlet controls in a non-discharging position against the resilient biasing force.

3. A spreader for distributing material comprising: a plurality of individual hoppers, each hopper having ground engaging wheels, material distributing means operated by wheel rotation, outlet means on the hopper bottom extending parallel to the axis of said wheels, a control vane positioned closely adjacent said outlet means on the exterior of said hopper and pivotally mounted on said hopper on an axis parallel with the wheel axis and movable in a limited fore and aft arc, its movement in the forward direction being effective to close said outlet means and its movement in the aft direction being effective to open said outlet means, means connected to and biasing said control vane toward its open position, and adjustable means engageable by said biasing means to limit biased movement in the vane open position; a spreader drawing device comprising a drawing member adapted to be hitched to a power means, a draw bar structure fastened to each of said hoppers and extending forwardly thereof, and means at the forward end of each of said draw bar structures providing a connection to said drawing member; and operating means for said control vanes comprising a control level pivotally mounted on said drawing device, a plurality of operating levers moved by said control lever and rigidly secured together to rotate on the same axis, a plurality of linkage means each being pivotally connected at one of its ends to the control vane of one hopper and pivotally connected at its other end to the end of an associated one of said operating levers, said operating lever rotational axis being disposed substantially between the ends of said linkage means, said other ends of each of said linkage means being simultaneously selectively movable by operation of said control lever from one side to the other of a line through the center of the pivotal connection of the linkage means with its associated control vane and said operating lever rotational pivot, said biasing means exerting a force tending to move said operating levers from the dead center position of said operating lever axis and the pivotal end connections of said linkage means, and limiting means cooperating with said control lever to limit movement of the operating levers on one side of said dead center position to enable said biasing means to maintain said control vanes in their closed position whenever said operating levers are on said one side of dead center position.

4. A spreader for distributing material comprising: a plurality of individual wheeled hoppers with lateral distributing means; a spreader drawing device comprising a drawing member adapted to be hitched to a power means, and a draw bar structure fastened to each of said hoppers and extending forwardly thereof and connected at their forward ends to said drawing member to dispose said hoppers in staggered relation wherein any hopper, staggered behind a preceding hopper, will have one end of its distributing means substantially longitudinally in line with the opposite end of the distributing means of the immediately preceding hopper; and means connecting to the aligned opposite ends of said hoppers to maintain the said longitudinal alignment and including means permitting vertical movement of one hopper relative to the aligned hopper.

5. A plurality of hopper type distributing spreaders that are connected in a staggered relationship as defined in claim 4, wherein said means connecting to the aligned opposite ends of said hoppers comprise: first means secured at one end of a hopper staggered behind a preceding hopper, second means secured to the adjacent opposite end of the preceding hopper, and third means connecting said first and second means in a manner permitting relative vertical displacement of said first and second means.

6. A spreader for distributing material comprising: a plurality of individual hoppers each having ground engaging wheels, material distribution means, and a hopper distribution outlet control; a gang spreader drawing device comprising a drawing member adapted to be hitched to a power means, and a draw bar structure fastened to each of said hoppers extending forwardly substantially along a longitudinal center line of the associated hopper, and connected at their forward ends in laterally spaced relation to said drawing member; and material distribution outlet control operating means including an assembly of a shaft and a hand lever operatively connected thereto, said shaft being journalled on said drawing member and extending laterally in front of all of said hoppers, and individual lever means connecting said shaft and the outlet control of each hopper whereby rotation of said shaft will simultaneously open or close all of said outlet controls, said operating means including an overcenter locking movement to maintain said outlet controls in a closed position when said shaft is pivoted to a predetermined position.

7. A spreader as defined in claim 6, wherein each of said outlet controls and their associated lever means are disposed so each said lever means engages a member fixed in predetermined relationship to said drawing member to limit the overcenter locking movement for each lever means.

8. A spreader as defined in claim 6, wherein overcenter locking movement of said operating means is limited by an abutment member fixed to said hand lever and shaft assembly movable to abut a fixed portion of said drawing device.

9. A drawing device for use with a plurality of individual wheeled hoppers each of which includes material distributing mechanism that has a discharge control resiliently biased to an aft position and selectively movable to adjustable aft positions to control material discharge and to a forward position to shut off material discharge comprising: a common drawing member adapted to be hitched to a power means; a plurality of draw bar structures, each structure adapted to be fastened to an individual hopper and so disposed relative to each other that attached hoppers will be in staggered, slightly overlapped, longitudinal arrangement; and an operating means adapted to be connected to all of the individual hopper material discharge controls including a pivotable lever mechanism having an overcenter locking movement, in which position said discharge controls will be maintained in their shut-off position against the resilient biasing force.

10. A spreader for distributing material comprising: a wheeled hopper having material distribution means with an adjustable outlet control movable fore and aft and resiliently biased toward an aft position permitting material discharge; a spreader drawing device comprising a drawing member adapted to be hitched to a power means, a draw bar structure fastened to said hopper and extending forwardly thereof, and means at the forward end of said draw bar structure providing a connection to said drawing member; and operating means connected to said outlet control, fixed on said drawing device with a pivotable lever mechanism including an overcenter locking movement to maintain said outlet control in a forward non-discharging position against the resilient biasing force.

11. A spreader as defined in claim 10, wherein said material distributing means includes a lateral row of apertures in the hopper bottom, each aperture being of elongate formation terminating in a convergent relation at the end closest to the front of said hopper and said adjustable outlet control comprises a lateral portion conforming to and extending closely adjacent the exterior bottom contour of said hopper across said lateral row of apertures with a substantially straight lateral edge disposed toward the front of said hopper and with means pivotally mounted on said hopper so movement of said outlet control toward the rear of said hopper will provide through passage from the inside to the outside of said hopper through said plurality of apertures between the convergent ends of said apertures and the substantially straight edge portion of said outlet control, the area of said through passage being regulated by the position of said outlet control.

12. A spreader for distributing material comprising: a hopper; ground engaging wheels on said hopper; material distributing means in said hopper operated by rotation of at least one of said wheels and including outlet means on the hopper bottom extending parallel to the axis of said wheels; a control vane positioned closely adjacent said outlet means on the exterior of said hopper and pivotally mounted on said hopper on an axis parallel with the wheel axis and movable in a limited fore and aft arc, its movement in the forward direction being effective to close said outlet means and its movement in the aft direction being effective to open said outlet means; means connecting to and biasing said control vane toward its open position; adjustable means engageable by said biasing means to limit biased movement of the vane to open position; a spreader drawing device comprising a drawing member adapted to be hitched to a power means, a draw bar structure fastened to said hopper and extending forwardly thereof, and means at the forward end of said draw bar structure providing a connection to said drawing member; and operating means connected to said outlet control vane, fixed on said drawing device with a pivotable lever mechanism including an overcenter locking movement to maintain said outlet control in a forward non-discharging position against the resilient biasing force.

13. A spreader as defined in claim 12, wherein said material distributing outlet means includes a lateral row of apertures in the hopper bottom, each aperture being of elongate formation terminating in a convergent relation at the end closest to the front of said hopper, and said adjustable outlet control comprises a lateral portion conforming to and extending closely adjacent the exterior bottom contour of said hopper across said lateral row of apertures with a substantially straight lateral edge disposed toward the front of said hopper and with means pivotally mounted on said hopper so movement of said outlet control toward the rear of said hopper will provide through passage from the inside to the outside of said hopper through said plurality of apertures between the convergent ends of said apertures and the substantially straight edge portion of said outlet control, the area of said through passage being regulated by the position of said outlet control.

14. A spreader as defined in claim 13 wherein said material distributing means includes a multiple vaned agitator rotatably disposed in the hopper on an axis parallel to and immediately above said lateral rows of apertures with each individual vane of said agitator rotationally aligned with an associated aperture and having a direction of rotation to force material from the front of the hopper down through the convergent portion of said apertures against the straight edge of said outlet control.

15. A spreader for distributing material comprising: a hopper having ground engaging wheels, material distribution means, and hopper distribution outlet control; a spreader drawing device comprising at least two forwardly extended members fastened to said hopper and disposed in convergent relation toward a longitudinal hopper center line, bracket means and a forwardly extended hitching means disposed between the forward convergent ends of said two members, and means securing the forward ends of said two members, said bracket means and said hitching means together; a material distribution outlet control operating means including a lever pivotally mounted on said bracket; and means interconnecting said lever and said outlet control including an overcenter movement to lock said control in the distribution shut-off position.

16. A drawing fitting for use in combination with a wheeled material distributing device having draw bar structure including at least two substantially horizontal forwardly disposed parallel members laterally spaced from each other with fastening means between the members, comprising: an integral body having one portion adapted to be disposed between the two parallel members of a draw bar structure and retained by the fastening means between the members, and a second forwardly extended portion vertically offset from said one portion with means adapted to be pivotally connected to a hitching lug of a powered machine.

17. A unitary hitch device for connecting a material distributing device to a powered vehicle comprising: a first member having two parallel end portions, a first angled intermediate portion integral with one end portion and a second intermediate portion substantially normal to said parallel portions and integrally joining said first intermediate portion to the other end portion whereby both end portions project in the same direction with one offset from the other by said angled and normal intermediate portions; a second member having two parallel end portions connected by a substantially normally disposed intermediate portion to provide a dog leg shaped member; the end of one of said end portions of said second member being engaged and fastened to the first member proximate the intersection of said two intermediate portions of said first portion to dispose said one of said end portions of said second member parallel to and spaced from said other end portion of said first member thereby providing a hook shaped body portion; the intersection of said intermediate portion and the other end portion of said second member being engaged and fastened to said angled intermediate portion to dispose said other end portion of said second member parallel to and spaced from said one end portion of said first member thereby providing a forked fitting adapted to be fastened to a powered vehicle; and support means secured between the two end portions that provide said forked fitting.

18. In a multiple spreader combination, a drawing device, a plurality of hopper type distributing spreaders connected in a staggered relationship to said drawing device and hopper alignment devices between staggered hoppers, each alignment device comprising: first bracket means rigidly secured at one end of a hopper staggered behind a preceding hopper, second bracket means rigidly secured to the adjacent opposite end of the preceding hopper, and a device connecting said two bracket means comprising a resiliently centered, vertically shiftable, sliding connection means permitting relative vertical displacement of said two bracket means.

19. A spreader for distributing material comprising: a wheeled hopper having material distribution means with an adjustable outlet control movable fore and aft and resiliently biased toward an aft position permitting material discharge; a spreader drawing device comprising a draw bar structure fastened to said hopper and extending forwardly thereof, and means at the forward end of said draw bar structure comprising one body portion for connection to said draw bar structure and a vertically offset forwardly extending body portion including means adapted to be pivotally connected to a hitching lug of a powered machine, the connection of said one body portion to the draw bar structure being selectively reversible to dispose said offset body portion above or below the level of said draw bar for use with large or small powered machines; and operating means, connected to said outlet control, fixed on said drawing device with a pivotable lever mechanism including an overcenter locking movement to maintain said outlet control in a forward non-discharging position against the resilient biasing force.

20. A spreader for distributing material comprising: a wheeled hopper having material distribution means with an adjustable outlet control movable fore and aft and resiliently biased toward an aft position permitting material discharge; a spreader drawing device comprising a draw bar structure fastened to said hopper and extending forwardly thereof, and means at the forward end of said draw bar structure comprising one body portion secured to said draw bar structure and an integral vertically offset forwardly extending body portion above the level of said draw bar adapted to be pivotally connected to a hitching lug of a powered machine; and operating means for said outlet control comprising a bracket secured to said means at the forward end of said draw bar structure, and a lever pivotally carried on said bracket, operatively connected to said outlet control and having an overcenter locking movement to maintain said outlet control in a forward non-discharging position against the resilient biasing force.

21. A spreader for distributing material comprising: a plurality of individual hoppers, each having material distribution means with an adjustable outlet control resiliently biased toward a discharging position; a spreader drawing device comprising a drawing member adapted to be hitched to a power means, a draw bar structure fastened to each of said hoppers and extending forwardly thereof, and means at the forward end of each of said draw bar structures providing a connection to said drawing member; operating means, connected to said outlet controls, fixed on said drawing device with a pivotable mechanism including a locking movement to maintain said outlet controls in a non-discharging position against the resilient biasing force.

22. In a multiple spreader combination, a drawing device, a plurality of hopper type distributing spreaders connected in a staggered relationship to said drawing device and hopper alignment devices between staggered hoppers, each alignment device comprising: first rigid means fastened at one end of a hopper staggered behind a preceding hopper; second rigid means fastened to the adjacent opposite end of the preceding hopper, and third means providing a vertical guide between and connecting said first and second means in a manner permitting relative vertical displacement of said first and second means.

23. A spreader for distributing material comprising: a wheeled hopper having material distribution means with an adjustable outlet control movable between discharging and non-discharging positions and resiliently biased toward the position permitting material discharge; a spreader drawing device comprising a draw bar structure fastened to said hopper and extending forwardly thereof, and means at the forward end of said draw bar structure comprising one body portion secured to said draw bar structure and an integral vertically offset forwardly extending body portion adapted to be pivotally connected to a hitching lug of a powered machine; and operating means, connected to said outlet control, fixed on said drawing device comprising a pivotable mechanism with a locking movement to maintain said outlet control in a non-discharging position against the resilient biasing force, said pivotable mechanism including a bracket secured to said means at the forward end of said draw bar structure, and a pivotable operable device carried on said bracket.

24. A spreader for distributing material comprising: a wheeled hopper having material distribution means with an adjustable outlet control movable between discharging and non-discharging positions and resiliently biased toward the position permitting material discharge; a spreader drawing device comprising a draw bar structure fastened to said hopper and extending forwardly thereof, and means at the forward end of said draw bar structure comprising one body portion for connection to said draw bar structure and a vertically offset forwardly extending body portion including means adapted to be pivotally connected to a hitching lug of a powered machine, the connection of said one body portion to the draw bar structure being selectively reversible to dispose said offset body portion above or below the level of said draw bar for use with large or small powered machines; and operating means, connected to said outlet control, fixed on said drawing device with a pivotable mechanism including a locking movement to maintain said outlet control in a non-discharging position against the resilient biasing force.

References Cited in the file of this patent

UNITED STATES PATENTS

| | | |
|---|---|---|
| Re. 24,189 | Peoples | July 31, 1956 |
| 1,240,818 | Buller | Sept. 25, 1917 |
| 1,888,821 | Fearn | Nov. 22, 1932 |
| 2,287,234 | Ducharme | June 23, 1942 |